United States Patent
Kim et al.

(10) Patent No.: US 9,641,759 B2
(45) Date of Patent: May 2, 2017

(54) MOBILE TERMINAL AND CONTROLLING METHOD THEREOF

(71) Applicant: LG ELECTRONICS INC., Seoul (KR)

(72) Inventors: Jisaeng Kim, Seoul (KR); Chaehee Lim, Seoul (KR); Kwanghee Choi, Seoul (KR); Junhwan Kim, Seoul (KR); Namsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/741,046

(22) Filed: Jun. 16, 2015

(65) Prior Publication Data

US 2016/0014340 A1 Jan. 14, 2016

(30) Foreign Application Priority Data

Jul. 10, 2014 (KR) .................. 10-2014-0086644

(51) Int. Cl.
*H04N 5/228* (2006.01)
*H04N 5/232* (2006.01)
(Continued)

(52) U.S. Cl.
CPC ......... *H04N 5/23287* (2013.01); *G06T 5/002* (2013.01); *G06T 5/003* (2013.01); *G06T 5/50* (2013.01); *H04N 5/217* (2013.01); *H04N 5/23248* (2013.01); *H04N 5/23251* (2013.01); *H04N 5/23258* (2013.01); *H04N 5/23264* (2013.01); *H04N 5/23267* (2013.01); *H04N 5/23293* (2013.01); *H04N 5/2625* (2013.01);
(Continued)

(58) Field of Classification Search
CPC ........... H04N 5/23277; H04N 5/23248; H04N 5/23267; H04N 5/217; H04N 5/23258; H04N 5/23293; G03B 2217/185
USPC .......................................... 348/208.6, 208.12
See application file for complete search history.

(56) References Cited

U.S. PATENT DOCUMENTS

| 8,120,658 B2 * | 2/2012 | Quan ................. | H04N 5/23248 348/208.12 |
| 8,570,386 B2 * | 10/2013 | Castorina ........... | H04N 5/23248 348/208.1 |
| 8,917,313 B2 * | 12/2014 | Shimada ................ | G03B 37/00 348/208.3 |

(Continued)

FOREIGN PATENT DOCUMENTS

| EP | 2 437 472 A1 | 4/2012 |
| EP | 2 453 407 A1 | 5/2012 |

(Continued)

*Primary Examiner* — Ngoc-Yen Vu
(74) *Attorney, Agent, or Firm* — Birch, Stewart, Kolasch & Birch, LLP

(57) ABSTRACT

A mobile terminal and controlling method thereof are disclosed, by which a sharp and clear photo can be composed using a plurality of photos taken by burst shooting. The present invention includes a camera, a sensing unit configured to detect a surrounding brightness, a user input unit configured to receive a photographing command, and a controller, if the photographing command is received, taking a first number of photos by burst shooting, the controller outputting a shaking eliminated photo based on a second number of photo(s) selected from the first number of the taken photos, wherein the second number is determined based on the detected surrounding brightness.

18 Claims, 14 Drawing Sheets

(51) Int. Cl.
  *H04N 5/217* (2011.01)
  *G06T 5/00* (2006.01)
  *G06T 5/50* (2006.01)
  *H04N 5/262* (2006.01)
  *H04N 5/222* (2006.01)

(52) U.S. Cl.
  CPC .............. *G06T 2207/10004* (2013.01); *G06T 2207/10148* (2013.01); *G06T 2207/20076* (2013.01); *G06T 2207/20182* (2013.01); *G06T 2207/20192* (2013.01); *G06T 2207/20201* (2013.01); *G06T 2207/30244* (2013.01); *G06T 2210/36* (2013.01); *G06T 2210/61* (2013.01)

(56) References Cited

U.S. PATENT DOCUMENTS

| | | | |
|---|---|---|---|
| 9,363,438 B2* | 6/2016 | Ben Israel | H04N 5/23277 |
| 9,426,409 B2* | 8/2016 | Beysserie | H04N 5/91 |
| 2004/0145673 A1 | 7/2004 | Washisu | |
| 2005/0053309 A1 | 3/2005 | Szczuka et al. | |
| 2008/0112644 A1* | 5/2008 | Yokohata | G06K 9/64 |
| | | | 382/278 |
| 2008/0136939 A1 | 6/2008 | Tamamura | |
| 2011/0096179 A1 | 4/2011 | Border et al. | |
| 2014/0168486 A1 | 6/2014 | Geiss | |

FOREIGN PATENT DOCUMENTS

| WO | WO 2008/039551 A1 | 4/2008 |
|---|---|---|
| WO | WO 2015/142496 A1 | 9/2015 |

* cited by examiner

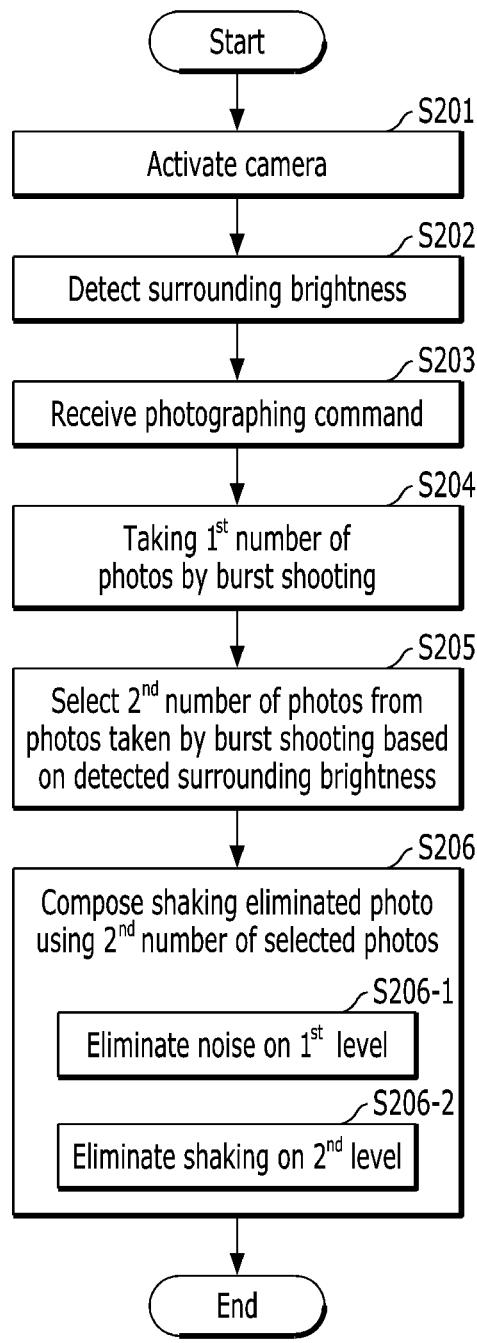

FIG. 5
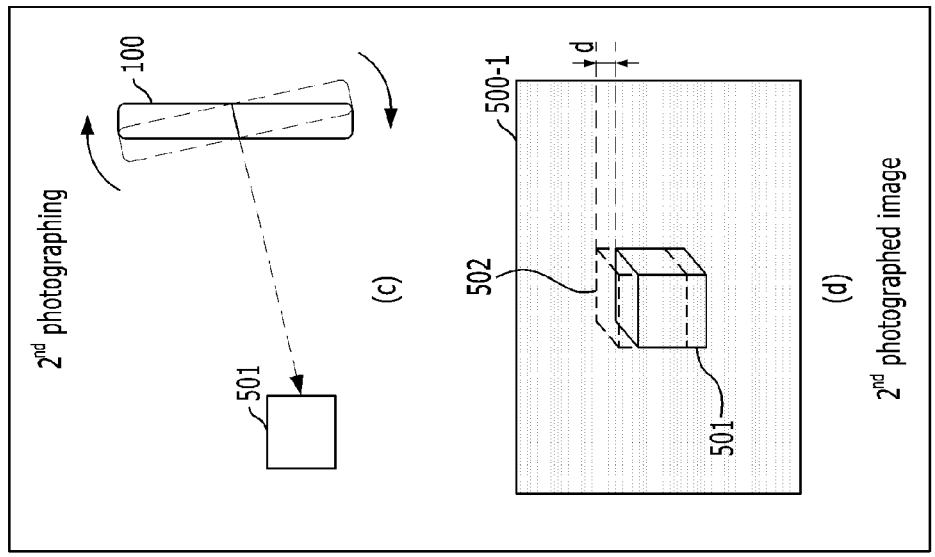
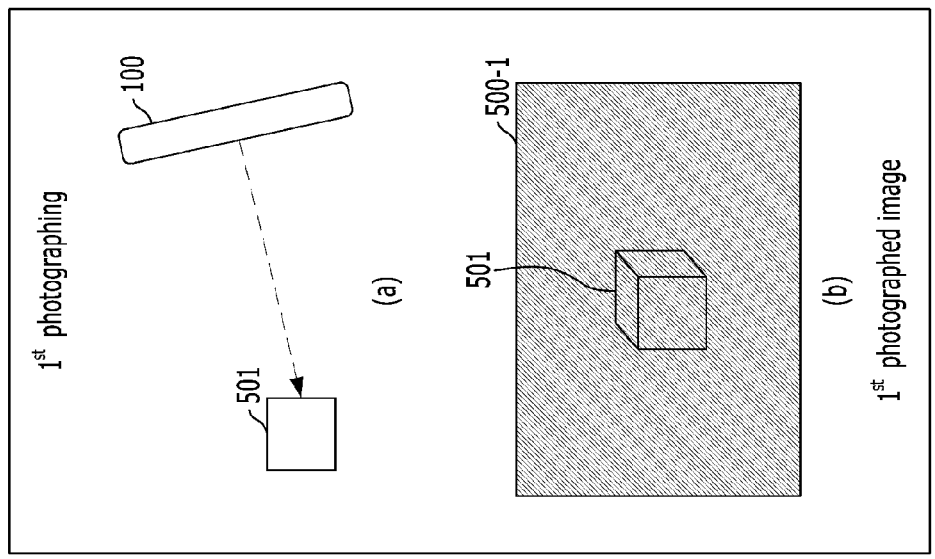

Composition of 1st and 2nd photographed images

FIG. 10
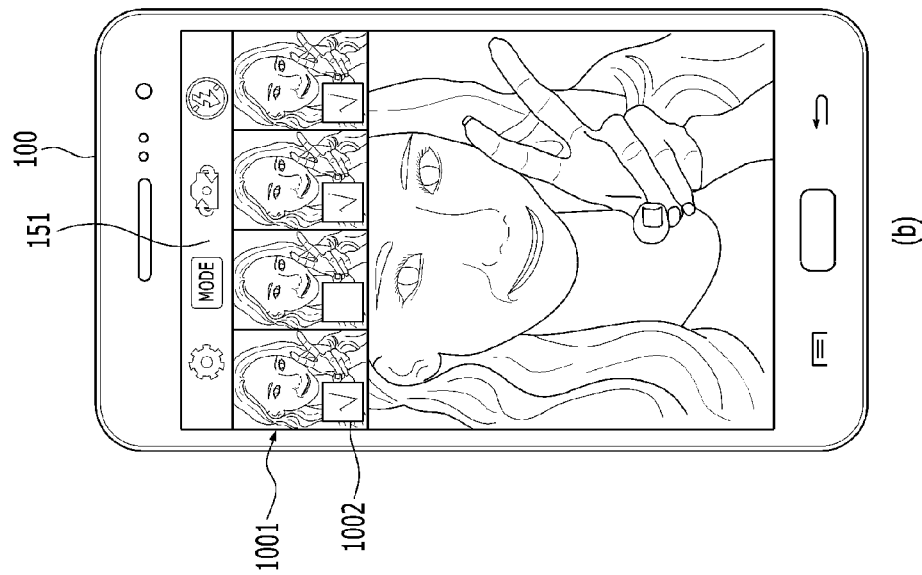
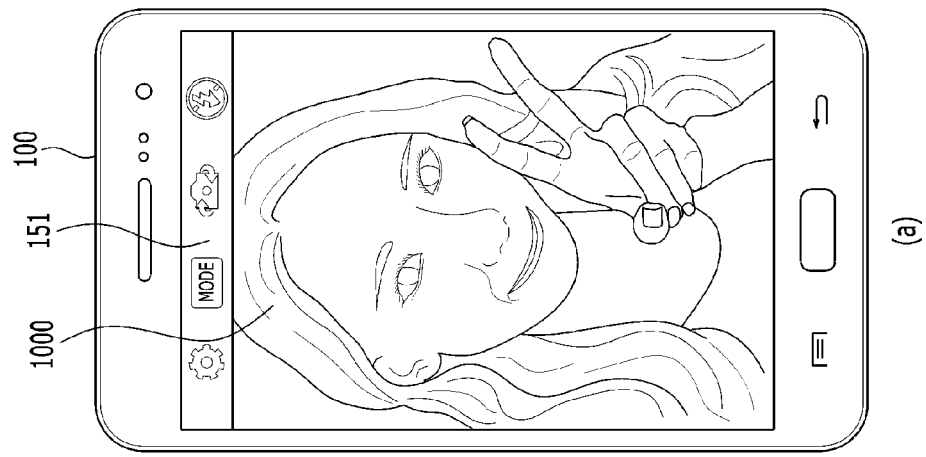

FIG. 12
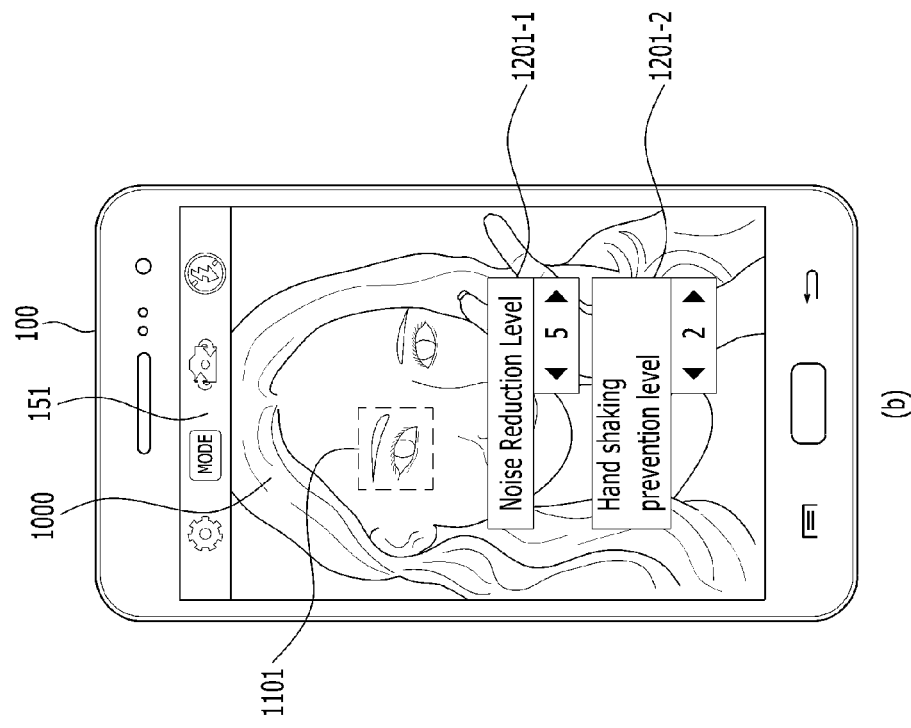
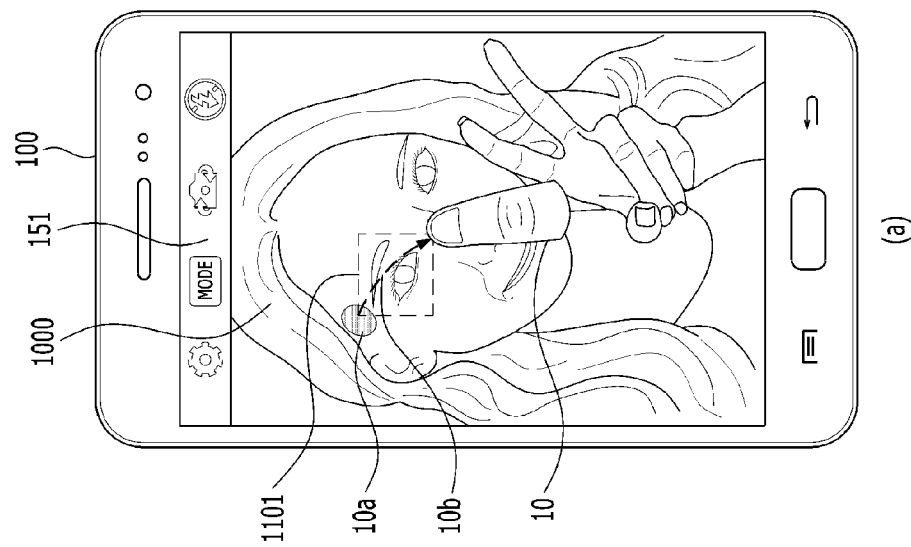

MOBILE TERMINAL AND CONTROLLING METHOD THEREOF

Pursuant to 35 U.S.C. §119(a), this application claims the benefit of earlier filing date and right of priority to Korean Application No. 10-2014-0086644, filed on Jul. 10, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, when a photo is taken using a mobile terminal, many ongoing efforts are made to research and develop an OIS (optical image stabilization) function for preventing an effect that a focus fails to be stabilized due to a hand tremor or the like. The principle of the OIS function can be schematically summarized as follows. First of all, it is able to eliminate or minimize a shaking or sway by detecting such a motion of a mobile terminal as an acceleration, an angular velocity or the like and then rotating a camera direction toward an opposite direction. In order to assist or replace the OIS function, the demand for a method (hereinafter generally named an OSI function) of eliminating a shaking by reconfiguring photographed image(s) is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a focus can be prevented from failing to be stabilized on taking a photo.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a camera, a sensing unit configured to detect a surrounding brightness, a user input unit configured to receive a photographing command, and a controller, if the photographing command is received, taking a first number of photos by burst shooting, the controller outputting a shaking eliminated photo based on a second number of photo(s) selected from the first number of the taken photos, wherein the second number is determined based on the detected surrounding brightness.

In another aspect of the present invention, as embodied and broadly described herein, a method of controlling a mobile terminal according to another embodiment of the present invention may include the steps of detecting a surrounding brightness, receiving a photographing command through a user input unit, if the photographing command is received, taking a first number of photos by burst shooting through a camera, and outputting a shaking eliminated photo based on a second number of photo(s) selected from the first number of the taken photos, wherein the second number is determined based on the detected surrounding brightness.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart for a control method of composing a shaking corrected photo according to one embodiment of the present invention;

FIG. 5 is a conceptional diagram for a control method of composing a photo based on a motion of the mobile terminal 100 detected through the sensing unit on burst shooting;

FIG. 10 is a diagram for a configuration of making a selection from a plurality of burst shots according to one embodiment of the present invention;

FIG. 12 is a diagram for a photographing configuration, in which a level of an OIS control method is independently settable for a prescribed region, according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
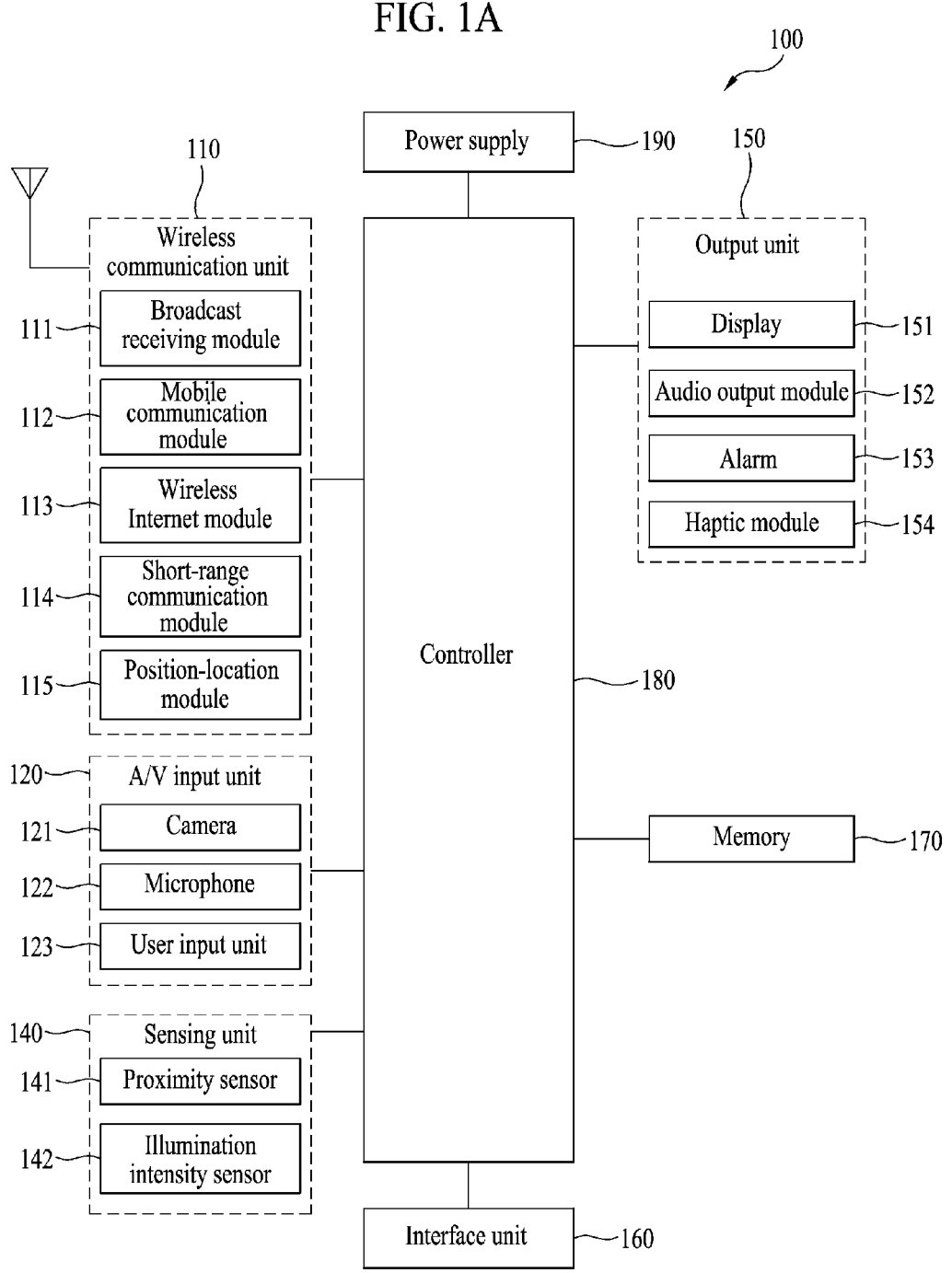
FIG. 1A is a block diagram of a mobile terminal in accordance with the present disclosure.
Figure 1B:
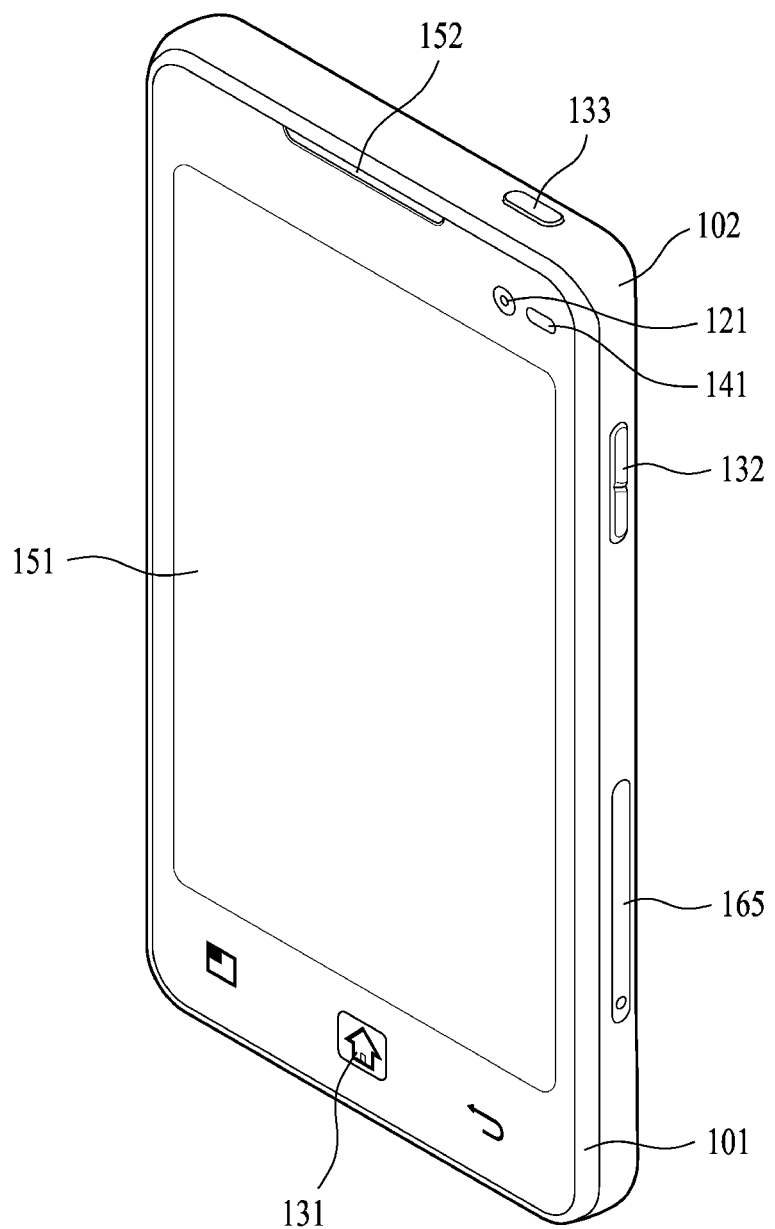
FIGS. 1B and 1C are conceptual views of one example of the mobile terminal, viewed from different directions.
Figure 1C:
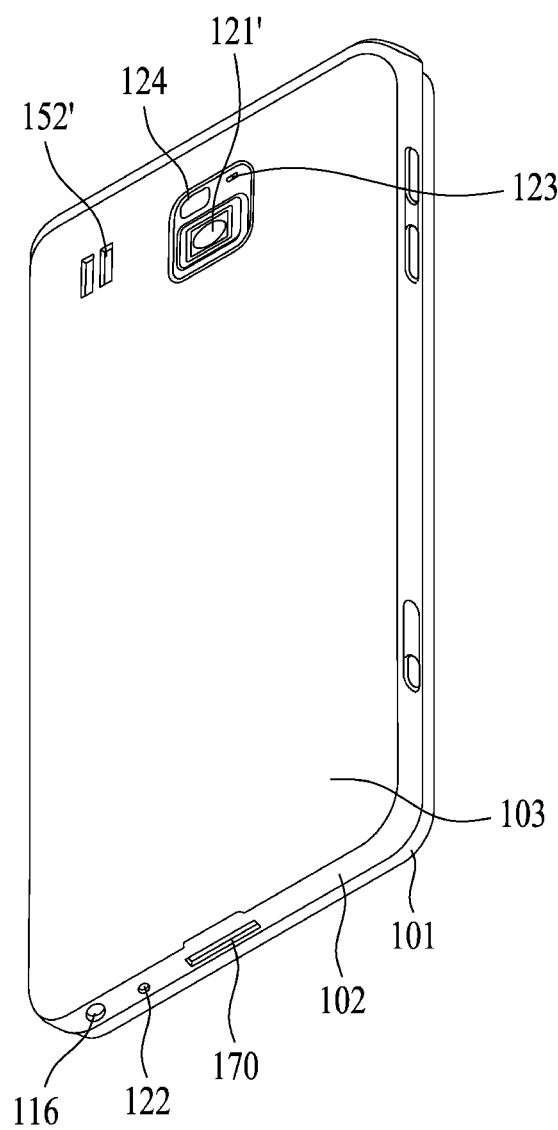

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

FIG. 2 is a flowchart for a control method of composing a shaking corrected photo according to one embodiment of the present invention.

Referring to FIG. 2, in a step S201, the controller 180 activates the camera 121. Subsequently, in a step S202, the controller 180 can detect a surrounding brightness through the sensing unit 140. If a photograph command is received from a user in a step S203, the controller 180 can take a first number of burst shots in a step S204. The reason for performing the burst shooting is to obtain a shaking corrected photo by composing a plurality of photos obtained from the burst shooting.

In a step S205, the controller 180 selects a second number of image data from the first number of the photos obtained by the burst shooting in the step S204. In this case, the second number may be equal to or smaller than the first number.

Figure 3:
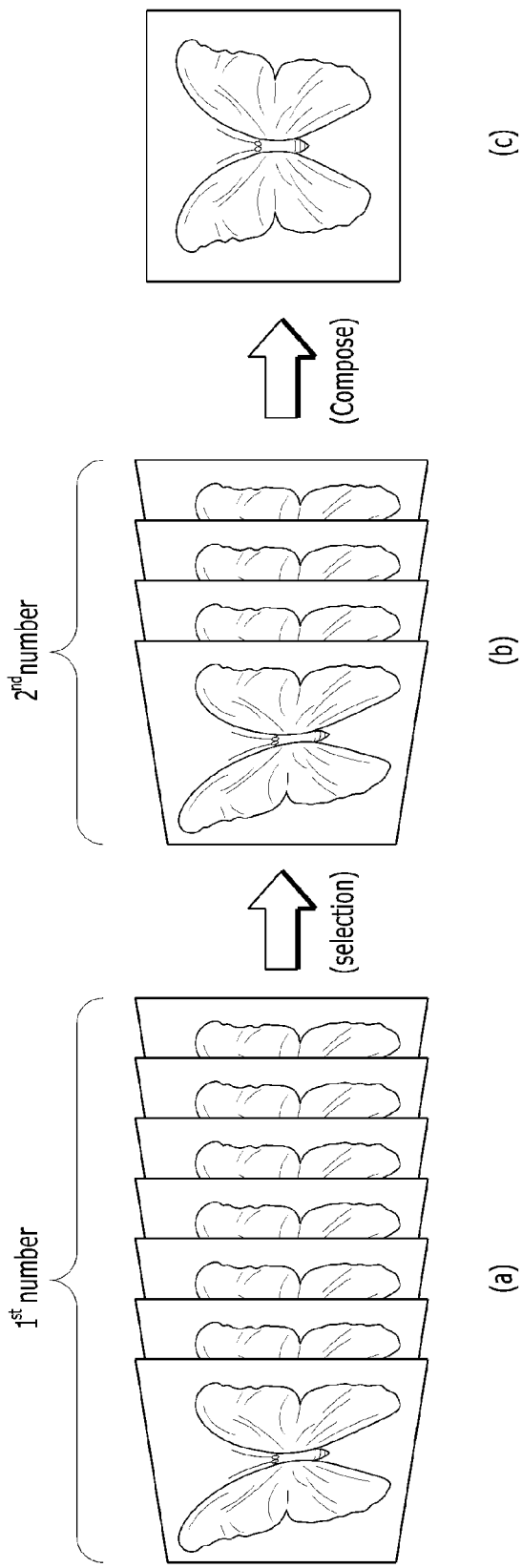
FIG. 3 is a conceptional diagram for one example of selecting some photos from burst shots and then obtaining a shaking corrected photo using the selected photos according to one embodiment of the present invention.

FIG. 3 is a conceptional diagram for one example of selecting some photos from burst shots and then obtaining a shaking corrected photo using the selected photos according to one embodiment of the present invention.

Referring to FIG. 3, a first number of photos are obtained by burst shooting [FIG. 3 (a)]. Subsequently, a second number of photos are selected from the first number of the photos by the controller 180 [FIG. 3 (b)].

According to one embodiment of the present invention, it is proposed that the selecting method is based on sharpness of a taken photo.

For first example, the controller 180 may be able to select a photo having good sharpness from the first number of the photos obtained from the burst shooting. Assuming that the sharpness of each photo can be represented as a numerical value, it may be able to select the second number of the photos, each of which has the sharpness equal to or greater than a prescribed numerical value only. Embodiments of the present invention are non-limited by the method of analyzing the sharpness of photo and may employ any related art control methods of analyzing sharpness.

For second example of selecting photos based on sharpness, according to one embodiment of the present invention, it may be able to further use the surrounding brightness detected in the step S202. The controller 180 determines the second number using the detected surrounding brightness. Once the second number is determined, the controller 180 can select the second number of the photos having high sharpness from the first number of the photos. For instance, if the second number is determined as '3' based on the surrounding brightness, the controller 180 may be able to select 3 images having high sharpness from 10 photos.

Referring to FIG. 3, by composing the second number of the selected photos, the controller 180 may output at least one shaking corrected photo 301 [S206 in FIG. 2]. In this case, the controller 180 provides a user with a plurality of shaking corrected photos 301 and may enable the user to select a desired photo from a plurality of the shaking corrected photos 301. In obtaining the shaking corrected (or eliminated) photo(s) based on the second number of the photos, it may be able to use a shaking eliminating method (algorithm) based on a plurality of application levels (hereinafter named a level).

with reference to a surrounding brightness and a method of determining a shaking/noise elimination level with reference to a surrounding brightness.

TABLE 1

| Detected surrounding brightness | EV (exposure value) Gain | Burst shot number (first number) | Selected number (second number) | Noise elimination level | Shaking elimination level |
|---|---|---|---|---|---|
| 0~7 lux (very dark room) | 36~58 times | 5 | 5 (all used without selection) | Level 2 | Level 2 |
| 8~30 lux (dark room) | 12~35 times | 5 | 5 (all used without selection) | Level 2 | Level 6 |
| 31~150 lux (slightly dark room) | 5~11 times | 5 | 2 (select 2 photos having high sharpness) | Level 1 | Level 6 |
| 150 lux~ (bright place) | 0~4 times | 5 | 1 (select 1 photo having highest sharpness) | (noise elimination not required at bright place) | (shaking elimination not required at bright place) |

According to one embodiment of the present invention, it is proposed to determine the second number based on a surrounding brightness. And, it is also proposed to control a level of a shaking eliminating method or a level of a noise eliminating method based on a surrounding brightness. In particular, according to such an embodiment, assume that the shaking eliminating method or the noise eliminating method can set a level. And, assume that the shaking or the noise can be eliminated according to the set level. If the level gets higher, the elimination can be achieved with higher performance. Yet, it may require more operations necessary for the elimination. On the contrary, if the level gets higher, the elimination can be achieved with lower performance. Yet, it may require less operations necessary for the elimination. According to one embodiment of the present invention, by selecting an appropriate level based on a surrounding brightness, it is proposed to eliminate the shaking or noise using minimum operations. In the following description, according to one embodiment of the present invention, assume that the level is classified into Level 1 to Level 6. In particular, Level 1 may be set as the highest level. If the level number increases higher, assume that the corresponding level gets lower.

In a step S206-1, when the noise eliminated photo is composed using the second number of the photos, the controller 180 may determine the noise elimination level as a first level based on the surrounding brightness detected in the step S202 and is then able to eliminate the noise on the determined first level. The more the number of the burst shots used for the noise elimination gets, the better the performance in eliminating the noise becomes.

Likewise, in a step S206-2, when the shaking eliminated photo is composed using the second number of the photos, the controller 180 may determine the shaking elimination level as a second level based on the surrounding brightness detected in the step S202 and is then able to eliminate the shaking on the determined second level. The more the number of the burst shots used for the shaking elimination gets, the better the performance in eliminating the shaking becomes.

Table 1 in the following shows the summary of detailed examples of a method of determining the selection number EV gain means a gain of amplifying intensity of light detected through an image sensing device.

First of all, referring to Table 1, since an extremely low illumination intensity is provided in a very dark room, a big EV gain is required. Hence, noise attributed to this EV gain may cause a problem. In this environment, noise elimination can be performed in priority (e.g., a noise elimination level is adjusted upward).

Secondly, since a dark room environment (i.e., section of 8~30 lux) has a brightness not difficult to recognize objects, both noise elimination and shaking elimination may need to be considered.

Thirdly, since noise may be of little importance in a slightly dark room (i.e., section of 31~150 lux), the controller 180 selects two photos having high sharpness from the first number of photos and is then able to use the selected two photos only. And, the controller 180 can output a shaking eliminated photo through a composition using the selected two photos.

Finally, since there is almost no noise or shaking in a bright place environment (i.e., over 150 lux), a photo having highest sharpness is selected from the first number of the burst shots and can be then provided to a user by skipping the noise/shaking elimination function.

Moreover, when burst shooting is performed, according to one embodiment of the present invention, it is able to control a burst shooting speed based on a detected surrounding brightness. In particular, if a surrounding brightness is high, it is able to minimize a time difference between taken photos by performing the burst shooting faster.

Meanwhile, according to one embodiment of the present invention, when an each shot is taken in burst shooting, a motion (i.e., shaking) of a mobile terminal is further detected. And, it is proposed to reflect the detected shaking in composing a photo. Such an embodiment is described in detail with reference to FIGS. 4 to 6 as follows.

Prevention of Problem of Unstable Focus Due to Shaking of Mobile Terminal in Photographing Generally, if the mobile terminal 100 is shaken by a hand tremor or the like on taking the photo or a subject moves on taking the photo [first cause], it may cause a problem that the subject fails to appear clearly in the taken photo. According to an embodiment described with reference to FIGS. 4 to 6 in the following, a control method for solving the problem due to the first cause is proposed. According to an embodiment described with reference to FIG. 8, a control method for solving a problem due to a second cause may be proposed. A control method for eliminating one of the above-mentioned two causes to solve the problem of the unclear subject in the photo shall be commonly named a shaking eliminating method.

Figure 4:
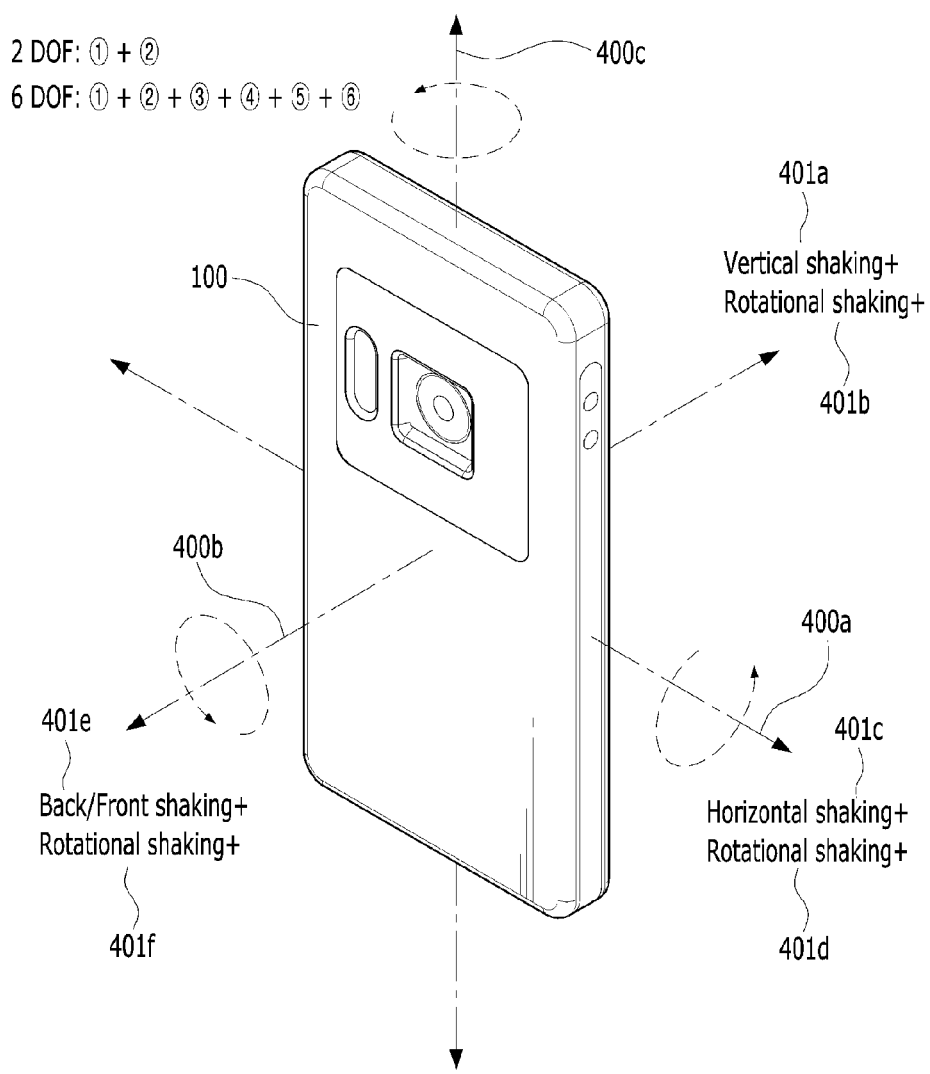
FIG. 4 is a diagram of 6 domains to detect shakings according to one embodiment of the present invention.

FIG. 4 is a diagram of 6 domains to detect shakings according to one embodiment of the present invention.

Referring to FIG. 4, when the mobile terminal 100 is set to an origin, an x-axis 400a, a y-axis 400b and a z-axis 400c are illustrated. The sensing unit 140 can detect shakings 401a, 401c and 401e for respectively detecting movements in directions of the x-axis 400a, the y-axis 400b and the z-axis 400c and rotational shakings 401b, 401d and 401f respectively centering on the x-axis 400a, the y-axis 400b and the z-axis 400c. Based on the result of the detections of the 6 domains detected through the sensing unit 140, the controller 180 can detect a motion (e.g., a shaken direction) of the mobile terminal 100 on the burst shooting and may be able to perform a photo composition based on the detected shaken direction.

A method of composing a photo based on a shaken direction is described in detail with reference to FIG. 5 as follows.

FIG. 5 is a conceptional diagram for a control method of composing a photo based on a motion of the mobile terminal 100 detected through the sensing unit on burst shooting.

Referring to FIG. 5, when a composition is performed using various photographed images, it may basically require a job of adjusting a location of a subject existing in each of the photos. The reason for this is that a photographing direction/location of a camera can be changed between the photographings of the burst shooting.

Referring to FIG. 5 (a) and FIG. 5 (c), after photographing has been performed twice by the burst shooting of the mobile terminal 100, a state of the mobile terminal 100 at the moment of each photographing is illustrated. FIG. 5 (a) shows a state that the mobile terminal 100 is tilted somewhat toward a prescribed subject 501 in taking a photo of the prescribed subject 501. FIG. 5 (c) shows a state that a photographing direction is lifted upward right before a prescribed subject 501 is photographed through the mobile terminal 100.

FIG. 5 (b) shows a first photographed image 500-1 taken in the state shown in FIG. 5 (a). It can be observed that the prescribed subject 501 is located at a central region of the first photographed image 500-1. FIG. 5 (d) shows a second photographed image 500-2 taken in the state shown in FIG. 5 (c). In this case, the second photographed image 500-2 may include an image taken right after the first photographed image 500-1. Since the photographing direction of the camera is lifted upward right before taking the second photographed image 500-2, the prescribed subject 501 existing in the second photographed image 500-2 may be located by being moved downward by a prescribed distance d from a subject location 502 on the first photographed image.

When noises/shakings are eliminated by composing the first photographed image 500-1 and the second photographed image 500-2, it is necessary to perform the composition while a location of a subject is matched. Hence, according to one embodiment of the present invention, it is proposed for the mobile terminal 100 to match a location of a subject existing on each photographed image based on shakings of the mobile terminal 100 detected through the sensing unit 140 on the burst shooting.

Figure 6:
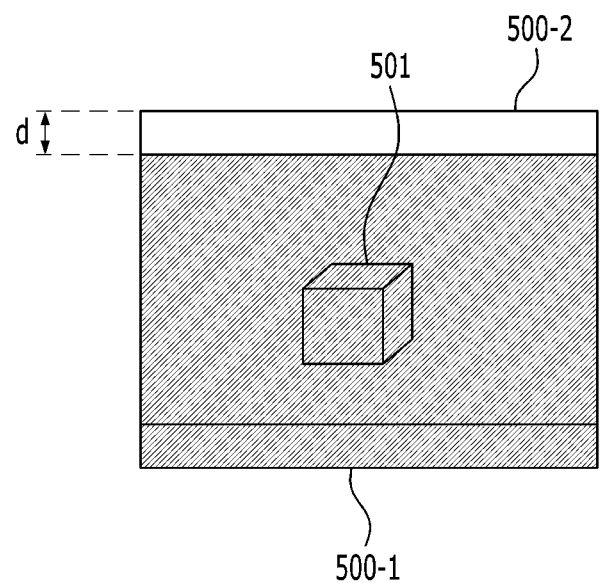
FIG. 6 is a conceptional diagram for matching a location of a prescribed subject 501 by adjusting an image offset between a first taken image 500-1 and a second taken image 500-2.

FIG. 6 is a conceptional diagram for matching a location of a prescribed subject 501 by adjusting an image offset between a first taken image 500-1 and a second taken image 500-2.

Referring to FIG. 6, since a location of a prescribed subject 501 on a second photographed image 500-2 exists at a location lower by a prescribed distance d than that of the prescribed subject 501 on a first photographed image 500-1, the mobile terminal 100 adjusts a location offset of the second photographed image 500-2 by the prescribed distance d in composing the first photographed image 500-1 and the second photographed image 500-2 and is then able to compose the second photographed image 500-1 with the first photographed image 500-1.

According to the embodiment described with reference to FIG. 5 and FIG. 6, the photographing direction of the mobile terminal 100 is lifted upward. And, such an embodiment can be identically applied to the photographing direction change and the subject location change, which are changed through the movements/rotational shakings in the directions of the x-axis 400a, the y-axis 400b and the z-axis 400c described with reference to FIG. 4.

A control method of eliminating noise is described in detail with reference to FIG. 7 as follows.

Noise Eliminating Method

Figure 7:
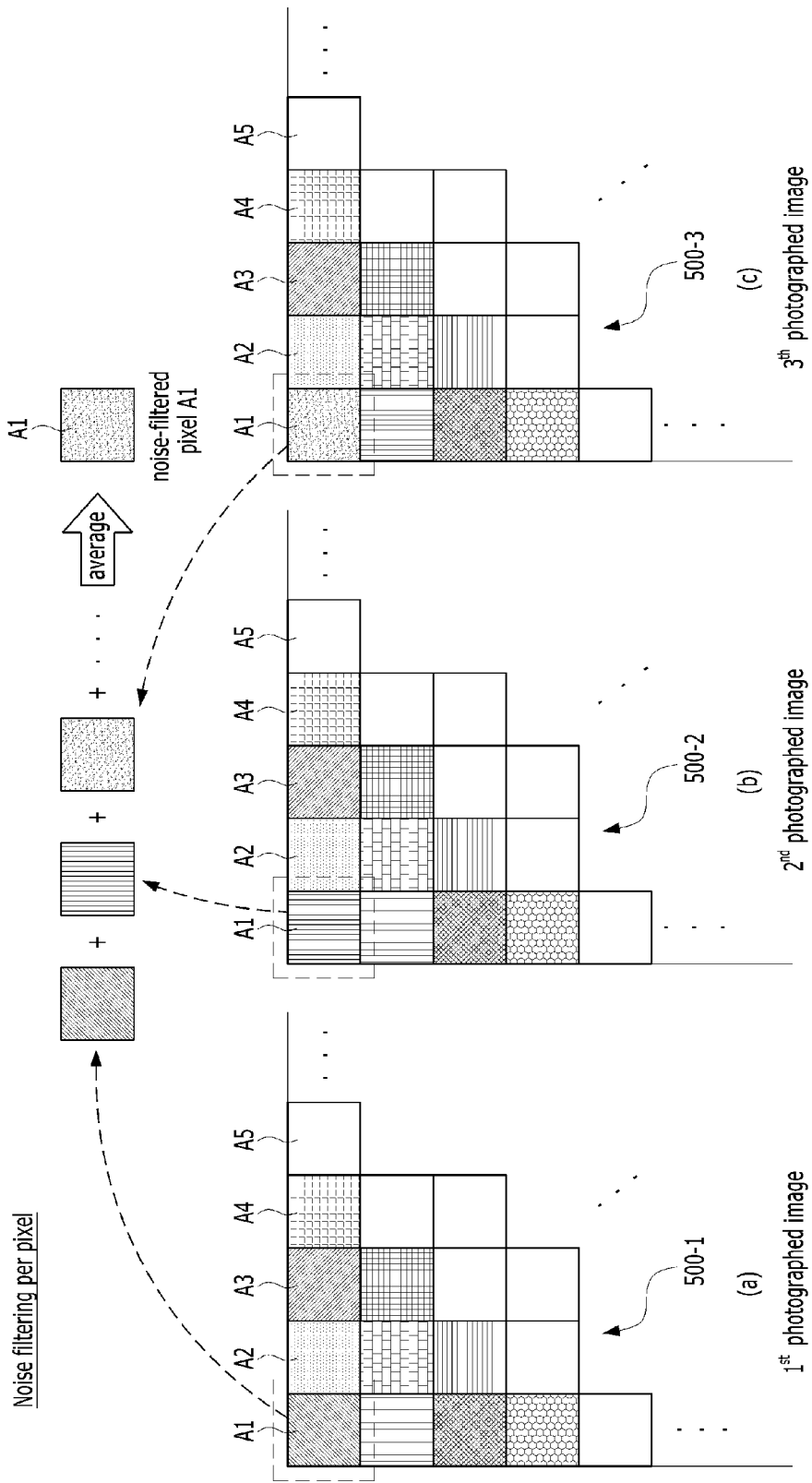
FIG. 7 is a diagram for a control method of eliminating noise according to one embodiment of the present invention.

FIG. 7 is a diagram for a control method of eliminating noise according to one embodiment of the present invention.

Generally, when a photographing is performed in a dark environment, a noise is generated (or worsened) due to an EV gain applied to a value detected by an image sensing device. The reason for this is described as follows. First of all, when a photographing is performed in a dark environment, since intensity of light detected by an image sensing device has a relatively small value, a high EV gain is applied. Secondly, the high EV gain is identically applied to a noise. Therefore, according to one embodiment of the present invention, it is proposed to filter the noise by calculating an average value between pixels corresponding to each other on a plurality of photos taken by burst shooting. Since the noise is randomly generated in general, if an average is applied between pixels, a pixel value changed by the noise can get closer to a real pixel value.

For instance, assuming that values (e.g., intensity of light detected by an image sensing device) of pixels corresponding to the same location on photos taken by 6-time burst shooting are 10, 10, 9, 11, 4 and 10, each of the pixels respectively having the values 9, 10 and 11 may include a noise-free pixel but a pixel having the value 4 may include a noise-mixed pixel. Hence, if the average of the values of the pixels is calculated, it becomes 9. Since the average 9 is close to the value 10 of the noise-free pixel, the noise can be regarded as eliminated.

FIG. 7 (a) shows a pixel structure of a first photographed image 500-1, FIG. 7 (b) shows a pixel structure of a second photographed image 500-2, and FIG. 7 (c) shows a pixel structure of a third photographed image 500-3.

Meanwhile, according to the description with reference to FIG. 7, assume that a pixel at the same location shows a photographing direction at the same location (i.e., a photographing location of a mobile terminal is assumed as not changed during the burst shooting).

It is able to determine a final value of a pixel A1 by calculating the average of values of pixels A1 existing on the respective photographed images (e.g., the pixel A1 on the first photographed image 500-1, the pixel A1 on the second photographed image 500-2, the pixel A1 on the third photographed image 500-3, etc.). In this case, the final value of the pixel A1 means the pixel A1 of a noise-filtered photo.

The noise elimination may be performed on the rest of pixels A2, A3 . . . by the same method as well as on the pixel A1.

Meanwhile, a value of a single pixel on a photo is determined as a combination of results of detections from the image sensing devices of 3 colors (RGB: red, green and blue). Hence, according to one embodiment of the present invention, the averaging operation may be performed on each of the RGB colors. Alternatively, it is apparent that the averaging operation can be performed on each Y(luma)UV (chroma) value depending on a color encoding/decoding method.

Meanwhile, in the above-described noise eliminating method, if the number of target pixels for calculating an average increases higher, it will be more advantageous in eliminating noise. Hence, according to one embodiment of the present invention, a level is set for the noise eliminating method and it is able to adjust the number of the used photographed images in accordance with the set level.

Prevention of Problem of Unstable Focus Due to Movement of Subject

Figure 8:
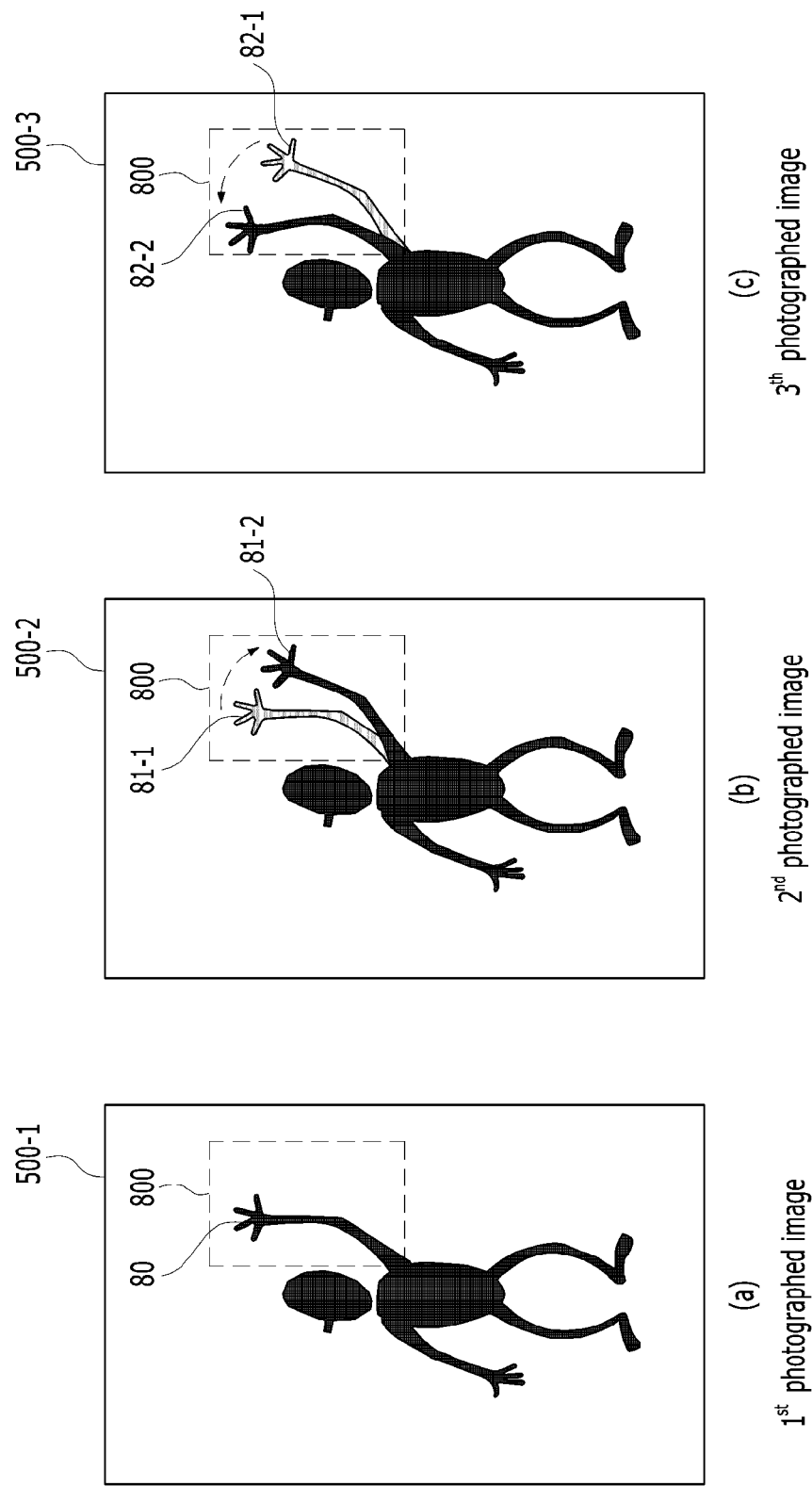
FIG. 8 is a diagram for a control method of determining a subject or region having a big motion on burst shots according to one embodiment of the present invention.

FIG. 8 is a diagram for a control method of determining a subject or region having a big motion on burst shots according to one embodiment of the present invention.

Referring to FIGS. 8 (*a*) to 8 (*c*), first to third photographed images 500-1 to 500-3 are illustrated. And, each of the photographed images includes a prescribed character as a subject.

If each of the photographed images is analyzed, a hand 80 raised by the prescribed character is swayed right and left with a relatively big motion. In particular, referring to FIG. 8 (*b*), a location 81-1 of the hand 80 shown in FIG. 8 (*a*) is different from a location 81-2 of the hand 80. Likewise, referring to FIG. 8 (*c*), the location 82-1 of the hand 80 shown in FIG. 8 (*b*) is different from a location 82-2 of the hand 80. In more particular, as the motion of the hand 80 of the prescribed character is big during the burst shooting, it may be difficult to perform a composition on a partial region 800 in which the corresponding hand 80 exists.

Therefore, according to one embodiment of the present invention, it is proposed that the mobile terminal 100 performs a composition on the partial region 800 using the less number of photos. In this case, the composition may be the composition for the noise elimination or the composition for the shaking elimination.

For instance, in performing a composition of a whole photo, assuming that 5 photographed images are used for a composition of an entire photo region, it is able to perform the composition on the partial region 800 using two photographed images (e.g., images having highest sharpness).

Meanwhile, in case of the shaking eliminating method, if the number of used photos increases higher, a corresponding effect may get better. In order to apply the shaking eliminating method, after an entire photo region is divided into a plurality of unit regions, it is able to detect a shaking (or a motion of a subject) by scanning each of the unit regions. If the unit region is further subdivided, the more previse elimination can be achieved. Hence, the level setting of the shaking eliminating method may be determined depending on how small a size of the unit region is set. Finally, in detecting the shaking (or motion of the subject) on the unit region, it may be able to set a different level in accordance with a threshold of a different value (Diff) on a corresponding unit region on each photographed image. When the threshold of the difference value is 6, if the difference value is 0~6, it is able to determine that there is no shaking. If the difference value is 7 or higher, it is able to determine that there is a shaking. Hence, if the threshold of the difference value gets lower, the shaking can be detected more precisely, which may be applicable to the level settings. The mobile terminal 100 according to one embodiment of the present invention can perform the shaking eliminating method in accordance with the set level.

According to one embodiment of the present invention, as mentioned in the foregoing description, it may be able to output a sharp and clear photo using the noise/shaking eliminating method. In the following description, the noise/shaking eliminating method shall be commonly named an OIS (optical image stabilization) control method.

A method of the aforementioned OIS function setting is described in detail with reference to FIGS. 9 to 12 as follows.

Figure 9:
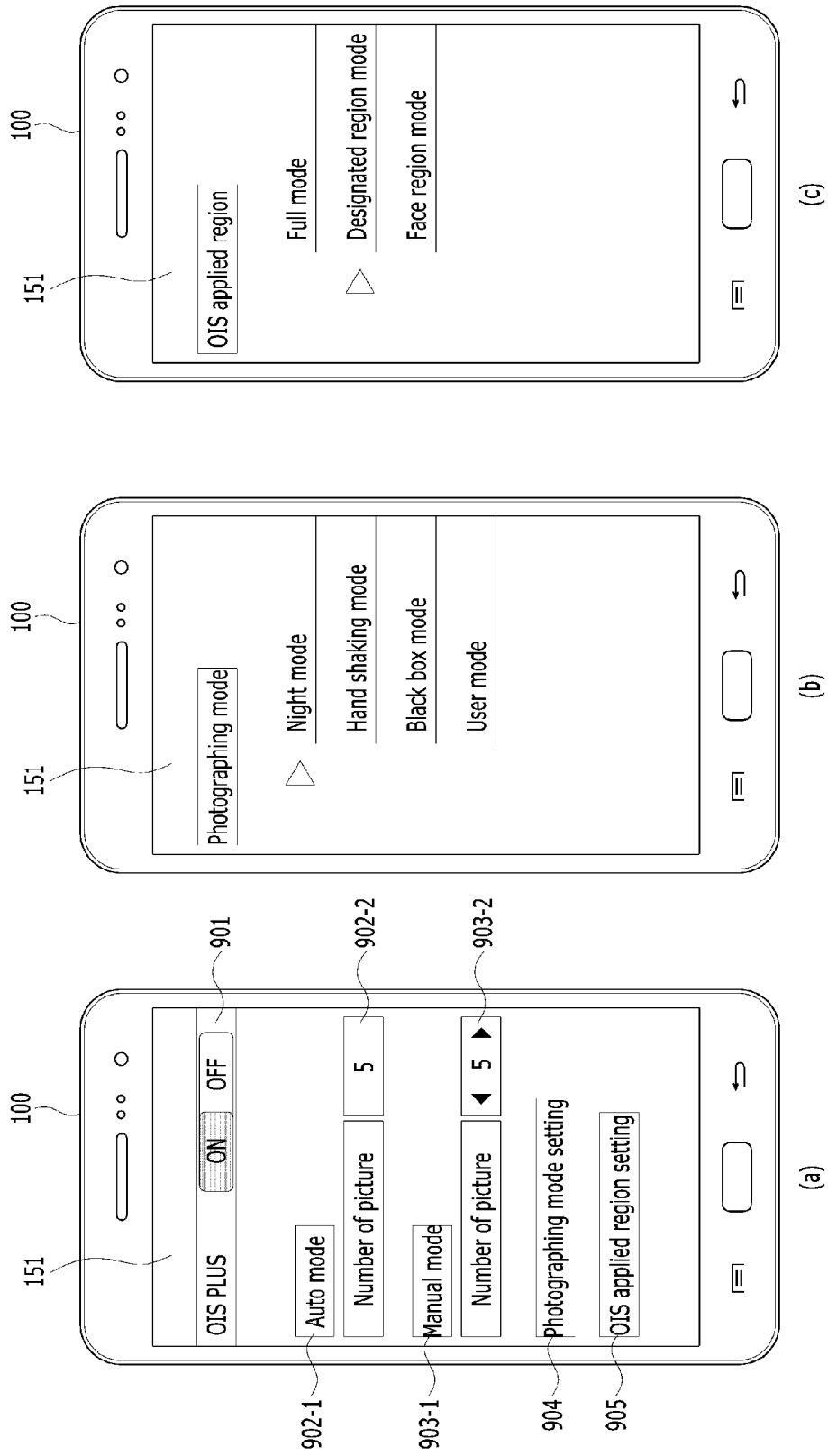
FIG. 9 is a diagram for configurations of a setting screen of an OIS function according to one embodiment of the present invention.

FIG. 9 is a diagram for configurations of a setting screen of an OIS function according to one embodiment of the present invention. Such a configuration diagram is just one example, by which an embodiment of the present invention is non-limited.

Referring to FIG. 9 (*a*), the mobile terminal 100 can output an OIS activating button 901 for activating/deactivating an OIS function on a setting screen. The mobile terminal 100 can include an auto mode switching button 902-1 for switching to an auto mode and a manual mode switching button 903-1 for switching to a manual mode. In this case, 'auto/manual' indicates whether the number of photos to be taken will be set by the controller 180 automatically or by a user for the burst shooting. The setting screen may further include an indicator 902-2 for guiding the number of the photos to be taken in case of selecting the auto mode and an indicator 903-2 for adjusting the number of photos to be taken in case of selecting the manual mode.

The setting screen may further include a photographing mode setting button 904 for setting a photographing mode and an OIS applied region setting button 905 for setting an OIS applied region.

If the photographing mode setting button 904 is selected, the mobile terminal 100 can output a setting screen for setting the photographing mode [FIG. 9 (*b*)]. In this case, the setting screen for setting the photographing mode can provide a menu for selecting at least one of a night mode, a hand shaking mode, a black box mode, and a user mode.

The night mode may mean a mode for setting a noise elimination level to be high. The hand shaking mode may mean a mode for setting a sharpness level or a ghost effect elimination level to be high. The black box mode may mean a mode for low power consumption to enable a long-term use with the same power. And, the user mode may mean a mode for a user to directly set up the above-listed settings (e.g., noise elimination level, sharpness level, etc.).

If the OIS applied region setting button 905 is selected, the mobile terminal 100 can output a setting screen for setting an OIS applied region [FIG. 9 (*c*)]. This setting screen can provide a menu for selecting at least one of a full mode, a designated region mode and a face region mode.

The full mode may mean a mode for applying the above-described OIS control method (e.g., the noise eliminating method, the shaking eliminating method, etc.) to the total regions of the burst shots. The designated region mode may mean a mode for applying the above-described OIS control method to a user-designated region. A method of designating a region shall be described in detail with reference to FIG.

11 later. The face region mode may mean a mode for applying the above-described OIS control method to a face region recognized on a photo.

FIG. 10 is a diagram for a configuration of making a selection from a plurality of burst shots according to one embodiment of the present invention.

FIG. 10 (a) is a diagram of a photographing configuration for taking a photo while a camera is activated. Referring to the photographing configuration diagram, a preview screen 1000 for image data received through the activated camera is included.

As a photographing command is received, the mobile terminal 100 can take a plurality of photos by the burst shooting. And, the mobile terminal 100 can output a preview thumbnail 1001 to the photographing configuration diagram. According to one embodiment of the present invention, a check box 1002 can be further outputted to each thumbnail of the preview thumbnail 100. In response to a selection command applied to the corresponding check box 1002 by a user, thumbnails included in the preview thumbnail 1001 may be selected entirely or in part. Moreover, the mobile terminal 100 may be able to perform a photo composition by applying the OIS control method using the selected thumbnail(s).

Figure 11:
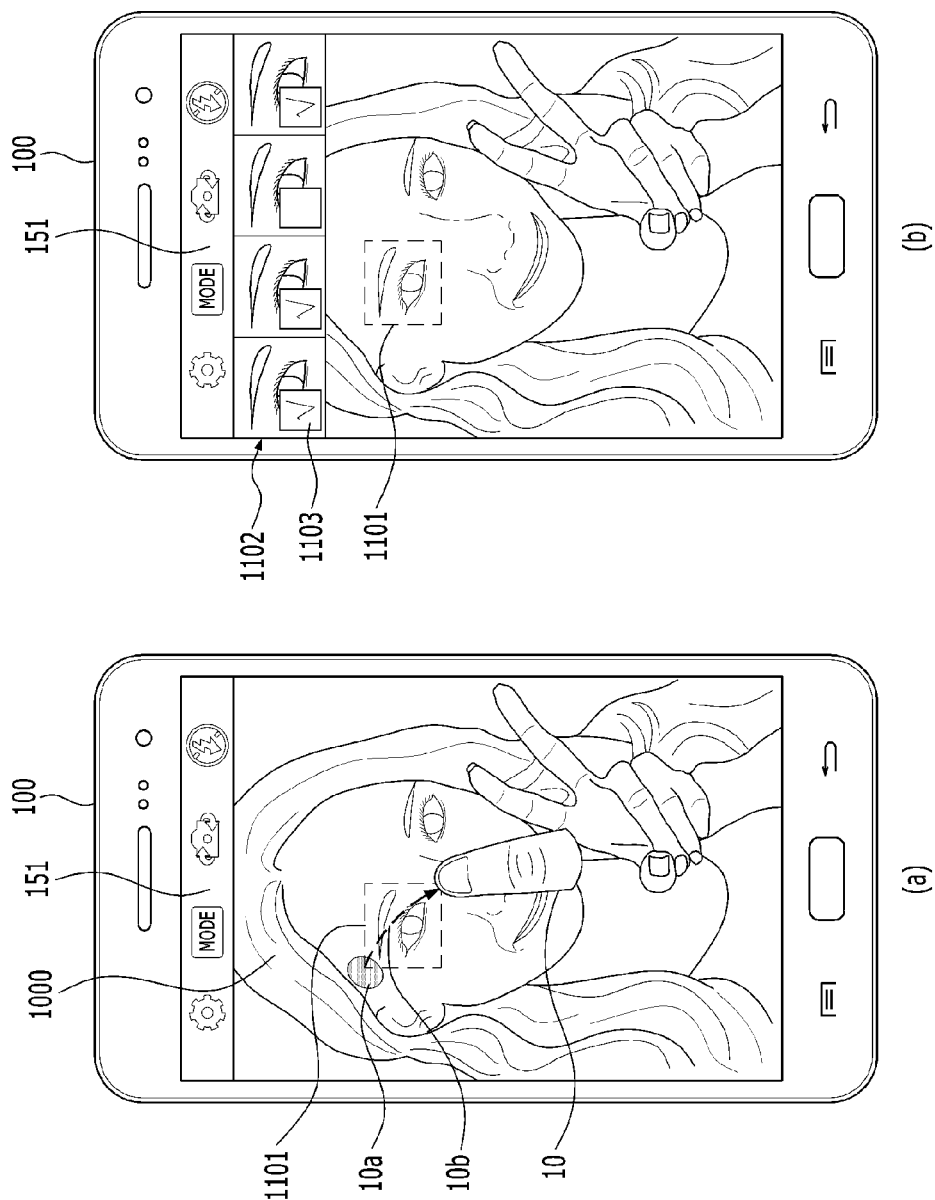
FIG. 11 is a diagram for a configuration of having a region designated by a user and then applying an OIS control method to the designated region only according to one embodiment of the present invention.

FIG. 11 is a diagram for a configuration of having a region designated by a user and then applying an OIS control method to the designated region only according to one embodiment of the present invention.

FIG. 11 (a) is a diagram of a photographing configuration for taking a photo while a camera is activated. Likewise, referring to the photographing configuration diagram, a preview screen 1000 for image data received through the activated camera is included.

If an input 10a and 10b for designating a prescribed region 1101 is applied to the preview screen 1000 (or one of photographed images) by a user, the controller 180 may be able to apply the OIS control method to the designated prescribed region 1101 only.

Referring to the configuration diagram shown in FIG. 11 (b), a preview thumbnail 1102 of the prescribed regions 1101 designated on a plurality of photos taken by the burst shooting is outputted. And, each thumbnail of the preview thumbnail 1102 is displayed together with a check box 1103.

The mobile terminal 100 may be able to apply the OIS control method based on the photographed image(s) selected entirely or in part through the check box(es) 1103.

Furthermore, according to one embodiment of the present invention, it is proposed to independently designate a level for a prescribed region 1101 designated by a user. A photographing configuration diagram related to such a control method is described in detail with reference to FIG. 12 as follows.

FIG. 12 is a diagram for a photographing configuration, in which a level of an OIS control method is independently settable for a prescribed region, according to one embodiment of the present invention.

Referring to FIG. 12 (a), if a user designates a prescribed region 1101, the controller 180 can further output level control indicators 1201-1 and 1201-2 for setting OIS control levels to the photographing configuration diagram.

Once the levels are set through the level control indicators 1201-1 and 1201-2, respectively, when the OIS control method is applied to the designated prescribed region 1101, the controller 180 can apply the corresponding OIS control method based on the set levels. In particular, the OIS applied levels for the entire image are applied using the former levels described with reference to Table 1 but the independently set levels may be applicable to the designated prescribed region.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a camera;
   a sensing unit configured to detect a surrounding brightness;
   a user input unit configured to receive a photographing command; and
   a controller configured to:
      when the photographing command is received, take a first number of photos by burst shooting,
      determine a second number of photo(s) based on the detected surrounding brightness,
      apply a shaking elimination algorithm divided into a plurality of application levels, wherein the application levels are determined based on the detected surrounding brightness, and
      output a shaking eliminated photo based on the second number of photo(s) selected from the first number of the taken photos.

2. The mobile terminal of claim 1, wherein the controller is further configured to select the determined second number of the photo(s) from the first number of the taken photos based on sharpness.

3. The mobile terminal of claim 2, wherein the controller is further configured to:
   calculate a sharpness value of each of the first number of the taken photos, and
   select the determined second number of the photo(s) in higher order of the calculated sharpness value.

4. The mobile terminal of claim 1, wherein each pixel of the shaking eliminated photo is configured with an average value of corresponding pixel(s) of the second number of the selected photo(s).

5. The mobile terminal of claim 1, wherein the shaking eliminated photo comprises a photo composed based on the second number of the photo(s).

6. The mobile terminal of claim 5, further comprising a sensing unit configured to detect a motion of the mobile terminal on performing the burst shooting, and
wherein the shaking eliminated photo comprises a photo composed by adjusting a location offset of each of the second number of the photo(s) based on the detected motion.

7. The mobile terminal of claim 1, further comprising a touchscreen, wherein the controller is further configured to output a thumbnail preview corresponding to the second number of the taken photo(s) through the touchscreen.

8. The mobile terminal of claim 7, wherein each thumbnail of the thumbnail preview includes a check box, and
wherein the controller is further configured to output the shaking eliminated photo based on the photo selected through the check box from the second number of the photo(s).

9. The mobile terminal of claim 1, further comprising a touchscreen configured to output a preview screen for one of the first number of the taken photo(s),
wherein when an input of designating a partial region on the preview screen is received from a user, the controller is further configured to output the shaking eliminated photo based on the designated partial region(s) for each of the first number of the taken photo(s).

10. A method of controlling a mobile terminal, the method comprising:
detecting a surrounding brightness;
receiving a photographing command through a user input unit;
when the photographing command is received, taking a first number of photos by burst shooting through a camera;
determining a second number of photo(s) based on the detected surrounding brightness;
applying a shaking elimination algorithm divided into a plurality of application levels, wherein each of the application levels is determined based on the detected surrounding brightness; and
outputting a shaking eliminated photo based on a second number of photo(s) selected from the first number of the taken photos.

11. The method of claim 10, further comprising:
selecting the determined second number of the photo(s) from the first number of the taken photos based on sharpness.

12. The method of claim 11, further comprising:
calculating a sharpness value of each of the first number of the taken photos; and
selecting the determined second number of the photo(s) in higher order of the calculated sharpness value.

13. The method of claim 10, wherein each pixel of the shaking eliminated photo is configured with an average value of corresponding pixel(s) of the second number of the selected photo(s).

14. The method of claim 10, wherein the shaking eliminated photo comprises a photo composed based on the second number of the photo(s).

15. The method of claim 14, further comprising:
detecting a motion of the mobile terminal on performing the burst shooting,
wherein the shaking eliminated photo comprises a photo composed by adjusting a location offset of each of the second number of the photo(s) based on the detected motion.

16. The method of claim 10, further comprising:
outputting a thumbnail preview corresponding to the second number of the taken photo(s) through a touchscreen.

17. The method of claim 16, wherein each thumbnail of the thumbnail preview includes a check box, and
wherein the outputting step comprises the step of outputting the shaking eliminated photo based on the photo selected through the check box from the second number of the photo(s).

18. The method of claim 10, further comprising:
further outputting a preview screen for one of the first number of the taken photo(s); and
when an input of designating a partial region on the preview screen is received from a user, outputting the shaking eliminated photo based on the designated partial region(s) for each of the first number of the taken photo(s).

* * * * *